United States Patent
Jeong et al.

(10) Patent No.: US 9,504,064 B2
(45) Date of Patent: Nov. 22, 2016

(54) METHOD AND SYSTEM FOR SCHEDULING IN MOBILE COMMUNICATION SYSTEM

(75) Inventors: Kyeong-In Jeong, Hwaseong-si (KR); Soeng-Hun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1561 days.

(21) Appl. No.: 12/053,851

(22) Filed: Mar. 24, 2008

(65) Prior Publication Data

US 2008/0232333 A1 Sep. 25, 2008

(30) Foreign Application Priority Data

Mar. 23, 2007 (KR) .................. 10-2007-0028907

(51) Int. Cl.
*H04J 3/00* (2006.01)
*H04W 72/12* (2009.01)
*H04W 76/04* (2009.01)

(52) U.S. Cl.
CPC ......... *H04W 72/1289* (2013.01); *H04W 76/04* (2013.01); *H04W 76/048* (2013.01)

(58) Field of Classification Search
USPC ........................................................ 370/336
See application file for complete search history.

(56) References Cited

U.S. PATENT DOCUMENTS

| | | | |
|---|---|---|---|
| 2005/0063330 A1 | 3/2005 | Lee et al. | |
| 2005/0117536 A1 | 6/2005 | Cho et al. | |
| 2005/0259662 A1* | 11/2005 | Kim | H04B 7/2637 370/395.4 |
| 2007/0242640 A1* | 10/2007 | Uchida | H04B 1/707 370/335 |
| 2008/0045272 A1* | 2/2008 | Wang | H04L 12/5695 455/561 |
| 2008/0090583 A1* | 4/2008 | Wang et al. | 455/452.1 |
| 2009/0252124 A1* | 10/2009 | Yeo | H04W 72/1252 370/336 |

FOREIGN PATENT DOCUMENTS

| | | |
|---|---|---|
| EP | 1 718 010 | 11/2006 |
| EP | 1 750 468 | 2/2007 |
| KR | 1020060072487 | 6/2006 |
| WO | WO 2006/073223 | 7/2006 |
| WO | WO 2007/024120 | 3/2007 |

* cited by examiner

*Primary Examiner* — Sulaiman Nooristany

(74) *Attorney, Agent, or Firm* — The Farrell Law Firm, P.C.

(57) ABSTRACT

A method and an apparatus for scheduling in a mobile communication system. According to the method, for data/message pre-promised between a UE and a network node, the UE transmits a scheduling request at a predetermined timing. When the network node receives the scheduling request at the predetermined timing, the network node directly allocates a resource for transmission of the promised data/message by itself, so that the UE can instantly transmit the data/message. As a result, transmission delay can be reduced.

16 Claims, 7 Drawing Sheets

METHOD AND SYSTEM FOR SCHEDULING IN MOBILE COMMUNICATION SYSTEM

PRIORITY

This application claims the priority under 35 U.S.C. §119(a) of an application filed in the Korean Industrial Property Office on Mar. 23, 2007 and assigned Serial No. 2007-28907, the contents of which are hereby incorporated by reference.

BACKGROUND OF THE INVENTION

1. Field of the Invention

The present invention relates to a method and an apparatus for scheduling in a mobile communication system, and more particularly to a method and an apparatus for allocating resources by an Evolved Node B according to a scheduling request transmitted in an uplink from a User Equipment (UE).

2. Description of the Related Art

A Universal Mobile Telecommunication Service (UMTS) system is a $3^{rd}$ Generation (3G) asynchronous mobile communication system, which uses wideband Code Division Multiple Access (CDMA) and is based on Global System for Mobile communications (GSM) and General Packet Radio Services (GPRS), which are used in European mobile communication systems. In the 3rd Generation Partnership Project (3GPP), which is in charge of standardization of the UMTS, active discussion is taking place about a Long Term Evolution (LTE) system as a next generation mobile communication system. The LTE technology is targeting commercialization by the year 2010 and the realization of high speed packet-based communication at a speed of about 100 Mbps. To this end, being discussed are various schemes, which include a scheme of reducing the number of nodes located in communication paths by simplifying the structure of a network, and a scheme of approaching a wireless protocol to a wireless channel as close as possible.

FIG. 1 illustrates an example of a structure of an Evolved UMTS mobile communication system to which the present invention is applicable.

Referring to FIG. 1, an Evolved UMTS Radio Access Network (E-RAN) 110 has a simplified 2 node structure, which includes Evolved Node Bs (ENBs) 120, 122, 124, 126, and 128 and anchor nodes 130 and 132. A User Equipment (UE) 101 is connected to an Internet Protocol (IP) network 114 through the E-RAN 110. The ENBs 120 to 128 correspond to legacy Node Bs of the UMTS system and are connected to the UE 101 through a wireless channel.

Different from legacy Node Bs, the ENBs 120 to 128 perform more complicated functions. In the LTE, all user traffic including the real-time service, such as Voice over IP (VoIP) using the Internet Protocol, is provided through a shared channel. Therefore, the LTE requires an apparatus for collecting status information of UEs and performing scheduling by using the collected information. The ENBs 120 to 128 take charge of the scheduling. Usually, one ENB controls a plurality of cells.

Further, the ENB performs Adaptive Modulation and Coding (AMC), which determines a modulation scheme and a channel coding rate in accordance with the channel status of a UE. As in High Speed Uplink Packet Access (HSUPA), which is also called "Enhanced Dedicated Channel (E-DHC)", and High Speed Downlink Packet Access (HSDPA) of the UMTS, Hybrid Automatic Repeat reQuest (HARQ) is performed between the ENBs 120 to 128 and the UE 101 in the LTE also. Because it is impossible by only the HARQ to satisfy requirements for various Qualities of Service (QoSs), an outer Automatic Repeat Request (ARQ) in a higher layer may be performed between the UE 101 and the ENBs 120 to 128.

The HARQ process refers to a process of soft-combining previously-received data with retransmitted data without discarding the previously-received data, thereby improving the ratio of success in the reception. The HARQ process is used in order to improve the transmission efficiency in high speed packet communication, such as High Speed Downlink Packet Access (HSDPA) and Enhanced Dedicated Channel (EDCH). In order to implement a maximum transmission speed of 100 Mbps, the LTE is expected to use Orthogonal Frequency Division Multiplexing (OFDM) in 20 MHz bandwidth as wireless connection technology.

FIG. 2 illustrates an example of a conventional process for transmission of data/message to an ENB through a scheduling request by a UE.

The scheduling request refers to a request for allocation of radio resources necessary for Buffer Status Report (BSR), which is transmitted by a UE when it is necessary to transmit the BSR to an ENB, for example, when the UE has received new data/message to be transmitted in an uplink from a higher layer, or when the UE has received data/message of a new size to be transmitted in an uplink from a higher layer despite that it had previously assigned resources for uplink data/message transmission from an ENB. Through the BSR, the UE notifies the ENB of detailed information on data/message size, etc. to be transmitted to the ENB. Based on information obtained from the BSR, the ENB allocates radio resources corresponding to the data/message to the UE.

Referring to FIG. 2, reference numerals 201, 203, 205, 207, and 209 denote Radio Frame Numbers (RFNs), and reference numerals 211, 213, 215, 217, and 219 denote radio resources allocated to the UE for transmission of the scheduling request. Although not shown in FIG. 2, the radio resources 211, 213, 215, 217, and 219 are promised in advance between the ENB and the UE through a higher layer message. Although the radio resources 211, 213, 215, 217, and 219 shown in FIG. 2 are radio resources of particular time and particular frequency, there is no limit in what the time and frequency of a radio resource which a channel transmitting the scheduling request will use.

When it is necessary to transmit a scheduling request for any of the allocated radio resources 211, 213, 215, 217, and 219, the UE signals it. If it is unnecessary to transmit the scheduling request, the UE either may not use the radio resources or may signal the absence of the scheduling request by using the radio resources. The following description is based on an assumption that the UE does not perform any signaling by using the radio resources when it is unnecessary to transmit the scheduling request. However, the present invention is not limited to this assumption.

At time point 221, when it is necessary to transmit a scheduling request due to some reason, for example, when the UE has received new data or message to be transmitted in an uplink from a higher layer, the UE signals the scheduling request by using a next radio resource 215 that the UE is allocated for scheduling request. Upon receiving the scheduling request 231, the ENB transmits a resource grant message 241 to the UE, thereby allocating a radio resource for transmission of a BSR of the UE. Upon receiving the resource grant message 241, the UE transmits a BSR 245 to the ENB by using the radio resource 243 according to radio resource information included in the resource grant message 241. The BSR may include a size of data/message to be transmitted by the UE, priority information of a Radio Bearer (RB) for transmitting the data/message, etc. Upon receiving the BSR 245, the ENB transmits a resource grant message 251 to the UE according to the information included in the BSR 245, thereby allocating a radio resource for transmission of the data/message. Upon receiving the resource grant message 251, the UE transmits data/message 255 by using the radio resource 253 according to radio resource information included in the resource grant message 251.

In the conventional process as described above, each of radio resources 211, 213, 217, and 219 for a scheduling request is not used if it is unnecessary to transmit the scheduling request at a corresponding time point.

As described above, in order to transmit data/message to an ENB, a UE must perform a process including: transmitting a scheduling request; receiving a resource grant message for transmission of a BSR; transmitting the BSR; receiving a resource grant message for transmission of data/message; and transmitting the data/message. This process results in a long time delay before the data/message is actually transmitted. Therefore, this scheduling process is not proper for transmission of data/message sensitive to the delay.

SUMMARY OF THE INVENTION

Accordingly, the present invention has been made to solve the above-mentioned problems occurring in the prior art, and the present invention provides a method and an apparatus for scheduling, which can effectively transmit data/message, which is sensitive to delay or frequently transmitted, without delay.

In accordance with an aspect of the present invention, there is provided a method for scheduling a UE by an Evolved Node B in a mobile communication system, the method includes setting a scheduling request timing for transmission of particular data when allocation of a resource for a scheduling request starts; signaling mapping information between the set scheduling request timing and the transmission of the particular data to the UE; allocating a radio resource for transmission of the particular data to the UE based on the mapping information when the Node B has received the scheduling request from the UE at the set scheduling request timing; and receiving the particular data from the UE through the allocated radio resource.

In accordance with another aspect of the present invention, there is provided a method for transmitting a scheduling request to an Evolved Node B by a UE in a mobile communication system, the method includes receiving particular data and mapping information for a scheduling request timing for transmission of the particular data from the Evolved Node B; when transmission of a scheduling request for transmission of the particular data is triggered, calculating a next scheduling request timing corresponding to the particular data from the mapping information; transmitting a scheduling request for transmission of the particular data at the calculated timing; and when a resource grant message for transmission of the particular data is received according to the mapping information, transmitting the particular data through a radio resource allocated by the resource grant message.

In accordance with another aspect of the present invention, there is provided an apparatus of an Evolved Node B for scheduling a UE in a mobile communication system, the apparatus including a transceiver unit for transmitting a message for allocation of a radio resource for transmission of a scheduling request to the UE, and receiving a scheduling request message from the UE through the allocated radio resource; a mapping information manager for managing mapping information between a particular scheduling request timing and transmission of particular information or particular data/message; a timing calculator for calculating a received timing and determining if the scheduling request corresponds to a scheduling request for transmission of the particular information or the particular data/message; and a scheduler for allocating a radio resource to the UE based on a result of the determination.

In accordance with another aspect of the present invention, there is provided an apparatus of a UE for transmitting a scheduling request to an Evolved Node B in a mobile communication system, the apparatus including a transceiver unit for receiving radio resource grant information for transmission of a scheduling request from the Evolved Node B and transmitting a scheduling request message to the Evolved Node B through a radio resource allocated according to the radio resource grant information; a mapping information manager for managing mapping information between a particular scheduling request timing and transmission of particular information or particular data/message; and a timing controller for, when a transmission packet for the particular data/message occurs or an indicator instructing transmission of the particular information is received from the higher layer, determining a timing for transmission of a scheduling request for transmission of the particular information or the particular data/message through the mapping information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
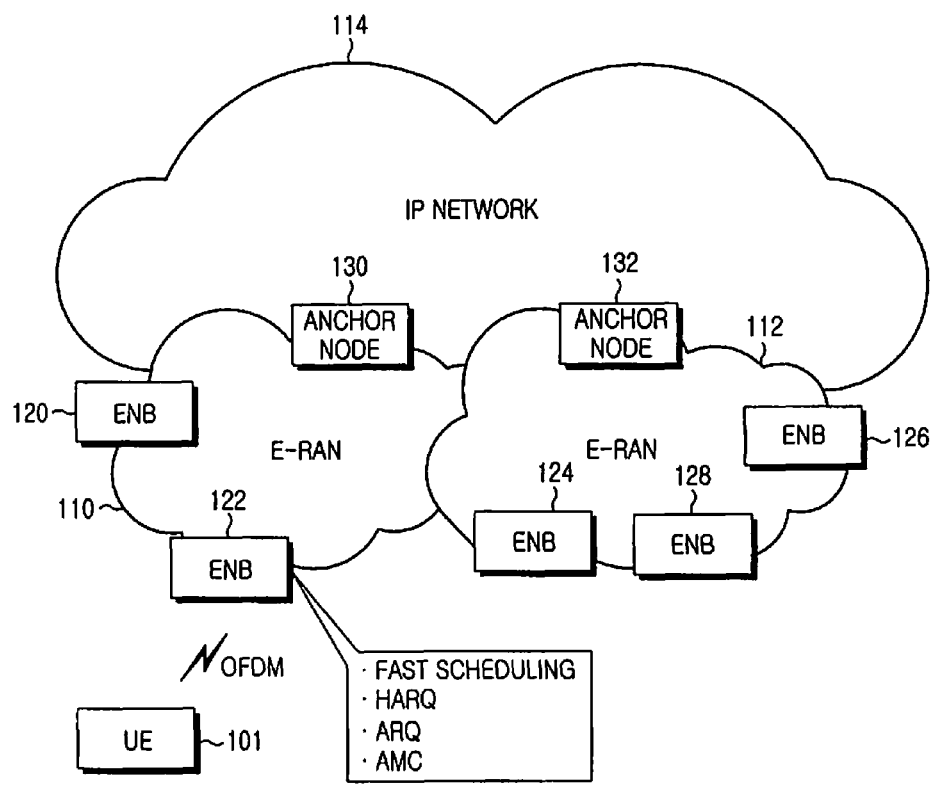
FIG. 1 is a block diagram illustrating a structure of a typical 3GPP LTE system.
Figure 2:
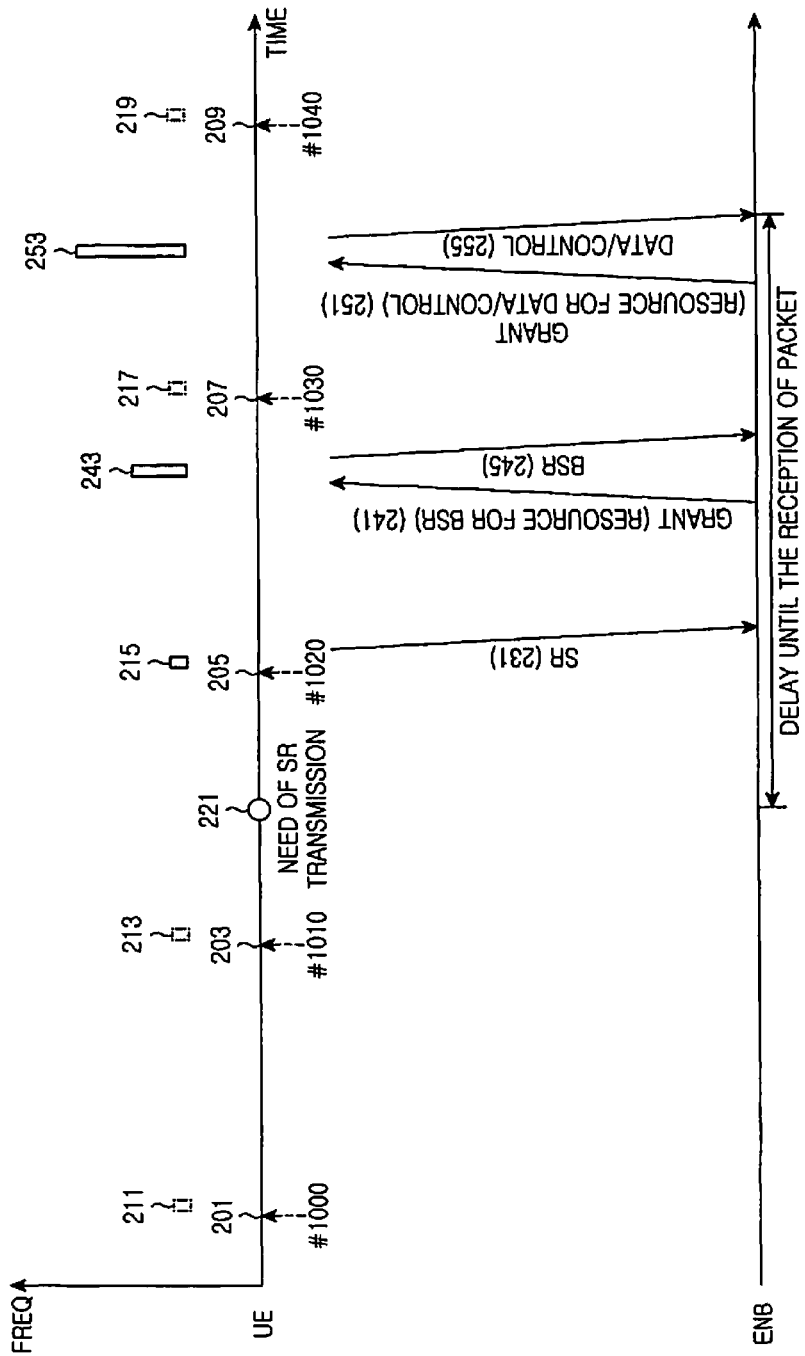
FIG. 2 illustrates an example of a conventional process for transmission of data/message to an ENB through a scheduling request by a UE.

Hereinafter, exemplary embodiments of the present invention will be described with reference to the accompanying drawings. In the following description, a detailed description of known functions and configurations incorporated herein will be omitted for clarity and conciseness. Further, various specific definitions found in the following description are provided only to help general understanding of the present invention, and it is apparent to those skilled in the art that the present invention can be implemented without such definitions.

According to the present invention, for data/message or size of the data/message that can be frequently transmissible and is sensitive to delay, particular scheduling request timings are mapped to transmission schemes (e.g. a Modulation and Coding Scheme (MCS) level) and radio resources to be allocated for transmission of the data/message, so that the mapping information is promised in advance between the UE and the ENB through a higher layer message or by using a hard coding method. When transmission of the data/message (size) is triggered, the UE transmits a scheduling request to the ENB at the promised timing. When the ENB receives the scheduling request at the promised timing, the ENB instantly allocates a radio resource promised between the UE and the ENB, instead of allocating a radio resource for transmission of a BSR to the UE.

A further embodiment of the present invention includes a method of mapping a particular scheduling request timing to particular meaningful information discriminated from allocation of a radio resource. For example, a state transition indication is mapped to a scheduling request of a particular timing in a Voice over IP (VoIP) service. Then, when a state transition, such as a state transition from a talk spurt state (a state in which a user generates actual voice data) to a silent state (a state in which a user does not generate actual voice data) or a state transition from the silent state to the talk spurt state, occurs while a UE uses a VoIP service, the UE transmits a scheduling request to the ENB at a pre-promised timing, thereby notifying the occurrence of state transition with the mapped pattern at the timing. Also, when the ENB receives the scheduling request at the pre-promised timing, the ENB recognizes the occurrence of state transition at the promised pattern and performs corresponding operation (such as scheduling change). The state transition indication in the VoIP service is only an example, and mapping of only meaningful information to a scheduling request of a particular timing may be promised between the UE and the ENB.

Further, according to the present invention, multiple pieces of mapping information may be used in mapping a particular scheduling request timing to allocation of a radio resource for transmission of particular data/message (size) or transmission of particular meaningful information. For example, if radio resources for transmission of a scheduling request have been allocated to the UE every 5 ms, some of the particular transmission timings may be used for a scheduling request for radio resource grant for transmission of particular data/message (size) and other particular transmission timings may be used for a scheduling request for radio resource grant for transmission of other particular data/message or for a scheduling request for transmission of particular meaningful information. Scheduling request timings that are not separately promised are timings for requesting radio resource for transmission of a BSR of a UE. Therefore, when the ENB receives a scheduling request at the timing not separately promised, the ENB grants a radio resource for transmission of a BSR to the UE.

Figure 3:
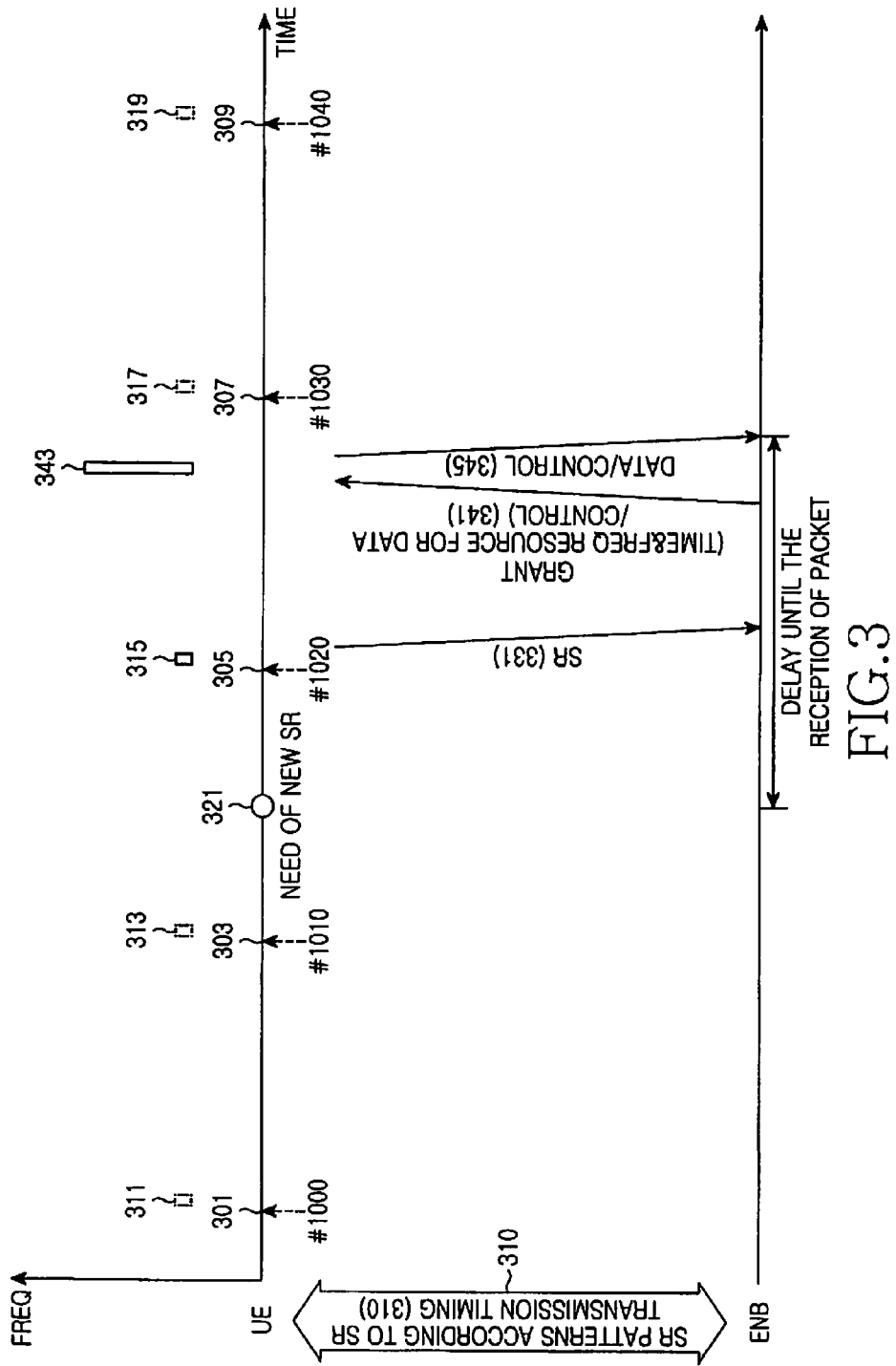
FIG. 3 illustrates an example of a process for transmission of data/message by using a scheduling request resource according to an embodiment of the present invention.

FIG. 3 illustrates an example of a process for transmission of data/message by using a scheduling request resource according to an embodiment of the present invention.

Referring to FIG. 3, reference numerals 301, 303, 305, 307, and 309 denote Radio Frame Numbers (RFNs), and reference numerals 311, 313, 315, 317, and 319 denote radio resources allocated to the UE for transmission of the scheduling request. For convenience of description, FIG. 3 is based on an assumption that radio resources 311, 313, 315, 317, and 319 of particular time and particular frequency, which can transmit a scheduling request to a particular UE at each 10 ms, have been allocated. There is no limit in the time and frequency of a radio resource in which a channel transmitting the scheduling request will use. The frequency of scheduling request transmission and allocation of radio resources are promised in advance between the ENB and the UE by using a higher layer message, such as a Radio Resource Control (RRC) message in step 310. That is, through the higher layer message, the UE and the ENB agree on a mapping pattern between particular scheduling request timing and allocation of radio resources for transmission of particular data/message (size) or particular meaningful transmission of information.

FIG. 3 is based on an assumption that a particular scheduling request timing is used in order to notify transition from a talk spurt state to a silent state, as an example of a VoIP service. Upon recognizing the transition of the UE from a talk spurt state to a silent state, the ENB converts a radio resource for transmission of a voice packet, which is allocated at each 20 ms in the talk spurt state, to a radio resource for transmission of an Adaptive Multi Rate Silence Descriptor (AMR SID) packet in the silent state, and then allocates the converted radio resource. Usually in the silent state, the initial AMR SID packet is transmitted at 20 ms after a final voice packet, the second AMR SID packet is transmitted at 60 ms after the initial AMR SID packet, and AMR SID packets thereafter are transmitted at each 160 ms. The transition from the talk spurt state to the silent state refers to the fact that it is necessary to allocate a radio resource for transmission of an AMR SID packet. Also, radio information source corresponding to the AMR SID packet is promised in advance between the ENB and the UE in step 310. The above description on the transmission characteristic of each state of the VoIP service is based on an AMR codec. However, in the case of using another codec, the transmission may show another characteristic depending on the used codec, instead of the characteristic described above.

In step 310, the UE and the ENB promise the following information in advance.

Mapping pattern with particular meaningful information or request for transmission of particular data/message or size of the data/message according to particular scheduling request timing.

FIG. 3 is based on an assumption that particular scheduling request timing is used in order to notify transition from a talk spurt state to a silent state in a VoIP service as described above. At this time, the following information can be promised between the UE and the ENB in step 310.

Codec information used for VoIP: AMR
    Request timing for particular scheduling to be mapped: N=20, RFN mod N (20)=0
    Mapping information: state transition in VoIP (talk spurt state→silent state)

According to the promise in step 310, the UE uses the radio resources 311, 315, and 319, which have RFNs 1000, 1020, and 1040 and satisfy (1000/1020/1040) mod N (20) =0, when the UE has transmitted from the talk spurt state to the silent state during the VoIP service, and uses the other radio resources 313 and 317 for scheduling request for the other BSR.

At the time point 321, when the UE starts to receive an AMR SID packet from a higher layer, the UE recognizes the AMR SID packet through the packet size smaller than the transmitted voice packet, and recognizes the occurrence of the transition from the talk spurt state to the silent state. At the time of transition from the talk spurt state to the silent state, the UE transmits a scheduling request 331 by using a scheduling request radio resource 315 corresponding to the next scheduling request timing 305 from among the scheduling request timings promised in step 310. Upon receiving the scheduling request 331, which is a scheduling request transmitted at a timing promised in step 310, the ENB recognizes that the VoIP service has transited from the talk spurt state to the silent state, and instantly allocates a radio resource for transmission of an AMR SID packet through a resource grant message 341 at a corresponding AMR SID packet transmission timing. Upon receiving the resource grant message 341, the UE transmits an AMR SID packet by using a radio resource 343 allocated through the resource grant message 341 in step 345.

Upon receiving the scheduling request 331, the ENB performs scheduling proper for the silent state. For example, in the case of using the AMR codec, in the silent state, the initial AMR SID packet is transmitted at 20 ms after a final voice packet in step 343, the second AMR SID packet is transmitted at 60 ms after the initial AMR SID packet, and AMR SID packets thereafter are transmitted at each 160 ms. The radio resource 343 for the initial AMR SID packet transmitted after step 343 can be continuously reused according to the promise between the UE and the ENB without a separate resource allocation process at a corresponding scheduling request timing from the transmission of the second AMR SID packet.

According to the conventional process, in a state where state transition from the talk spurt state to the silent state has occurred, when the UE receives a packet (AMR SID packet) having a new size smaller than that of a voice packet from a higher layer, the UE transmits a scheduling request in order to request a radio resource for transmission of a BSR corresponding to a higher layer message notifying the state transition or a BSR corresponding to the AMR SID at the next scheduling request timing. Upon receiving the scheduling request, the ENB allocates a radio resource for transmission of a BSR by transmitting a resource grant message. Then, the UE transmits a BSR to the ENB by using the allocated radio resource, and the ENB transmits a resource grant message including a radio resource for transmission of a higher layer message notifying the state transition or an AMR SID packet to the UE based on information included in the BSR. Then, the UE transmits an AMR SID packet or a higher layer message notifying the state transition by using the radio resource. This process includes many intermediate steps of signaling exchange, which may cause a waste of radio resources and a long delay. Therefore, the present invention aims at omission of the steps of resource allocation for a BSR and transmission of the BSR, which can reduce the waste of radio resources and time delay.

Figure 4A:
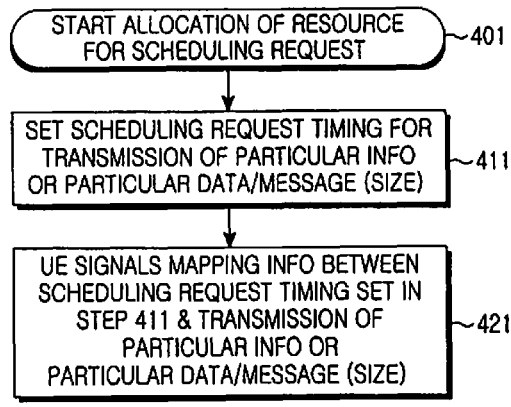
FIGS. 4A and 4B are flow diagrams illustrating an operation of an ENB according to an embodiment of the present invention.
Figure 4B:
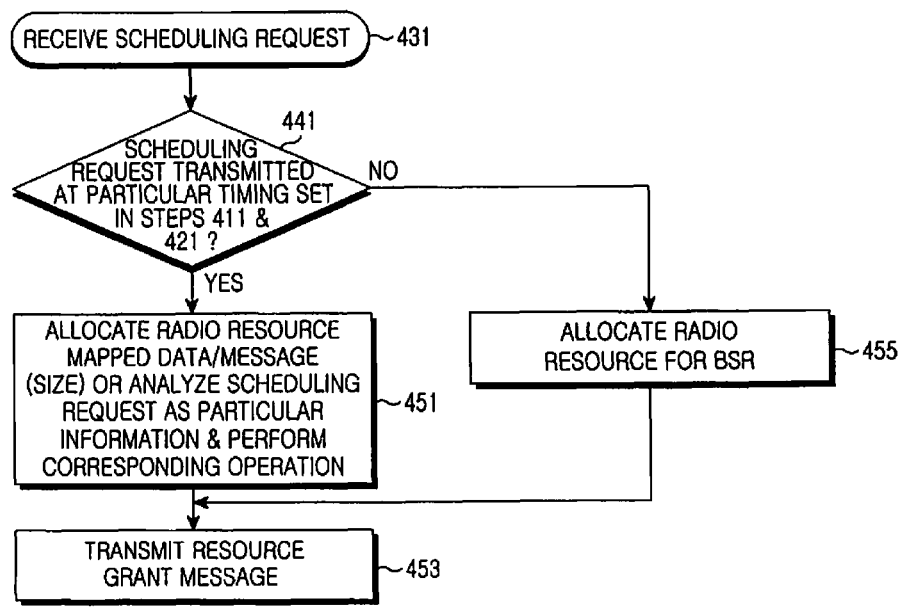

FIGS. 4A and 4B are flow diagrams illustrating an operation of an ENB according to an embodiment of the present invention. Specifically, FIG. 4A illustrates an operation of an ENB when the ENB sets resource information for scheduling request, and FIG. 4B illustrates an operation of an ENB when the ENB receives a scheduling request from a UE.

Referring to FIG. 4A, when resource allocation for transmission of a scheduling request for a UE starts in step 401, the ENB determines a scheduling request timing (hereinafter, referred to as a "particular scheduling request timing") for transmission of particular information or particular data/message or the size of the data/message in step 411. Then, in step 421, the ENB signals mapping information between particular transmitted information or particular data/message (size) and the particular scheduling request timing set in step 411 to the UE. As described above with reference to FIG. 3, the mapping information signaled in step 421 may include the following information.

Timing of a particular scheduling request to be mapped:
  N (scheduling request timing at RFN wherein RFN mod N=0)
Mapping information: particular information or particular data/message (size)
Codec information used for VoIP may be added in the case of a VoIP service In step 411, a scheduling request for requesting a radio resource for transmission of a BSR is transmitted at the other scheduling timings except for the particular scheduling request timing for transmission of particular information or particular data/message (size).

Referring to FIG. 4B, in step 431, the ENB receives a scheduling request from a UE. Then, in step 441, the ENB determines if the received scheduling request is a scheduling request separately defined and received from the UE at the particular scheduling request timing set and transmitted in steps 411 and 421 of FIG. 4A. When the received scheduling request is a scheduling request transmitted from the UE at the particular scheduling request timing set and transmitted in steps 411 and 421 of FIG. 4A, the ENB proceeds to step 451 in which the ENB allocates a radio resource for transmission of data/message (size) mapped at the corresponding timing or analyzes the scheduling request as particular information and performs a corresponding operation. After allocating the radio resource in step 451, the ENB transmits a resource grant message including the radio resource information to the UE in step 453.

In contrast, as a result of the determination in step 441, when the received scheduling request is not the scheduling request transmitted at the particular scheduling request timing set and transmitted in steps 411 and 421, but is an other scheduling request transmitted from the UE, the ENB proceeds to step 455 in which the ENB allocates a radio resource for transmission of a BSR of the UE. Then, in step 453, the ENB transmits a resource allocation message including this information to the UE.

Figure 5A:
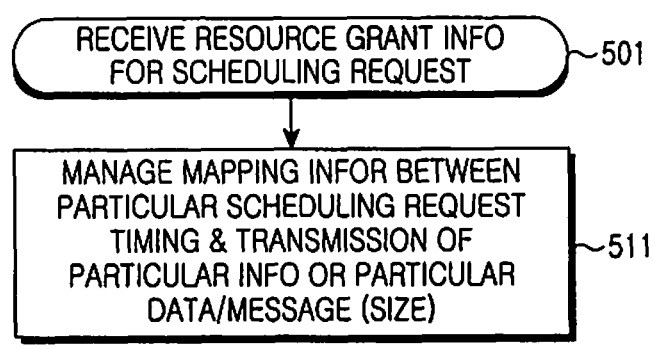
FIGS. 5A and 5B are flow diagrams illustrating an operation of a UE according to an embodiment of the present invention.
Figure 5B:
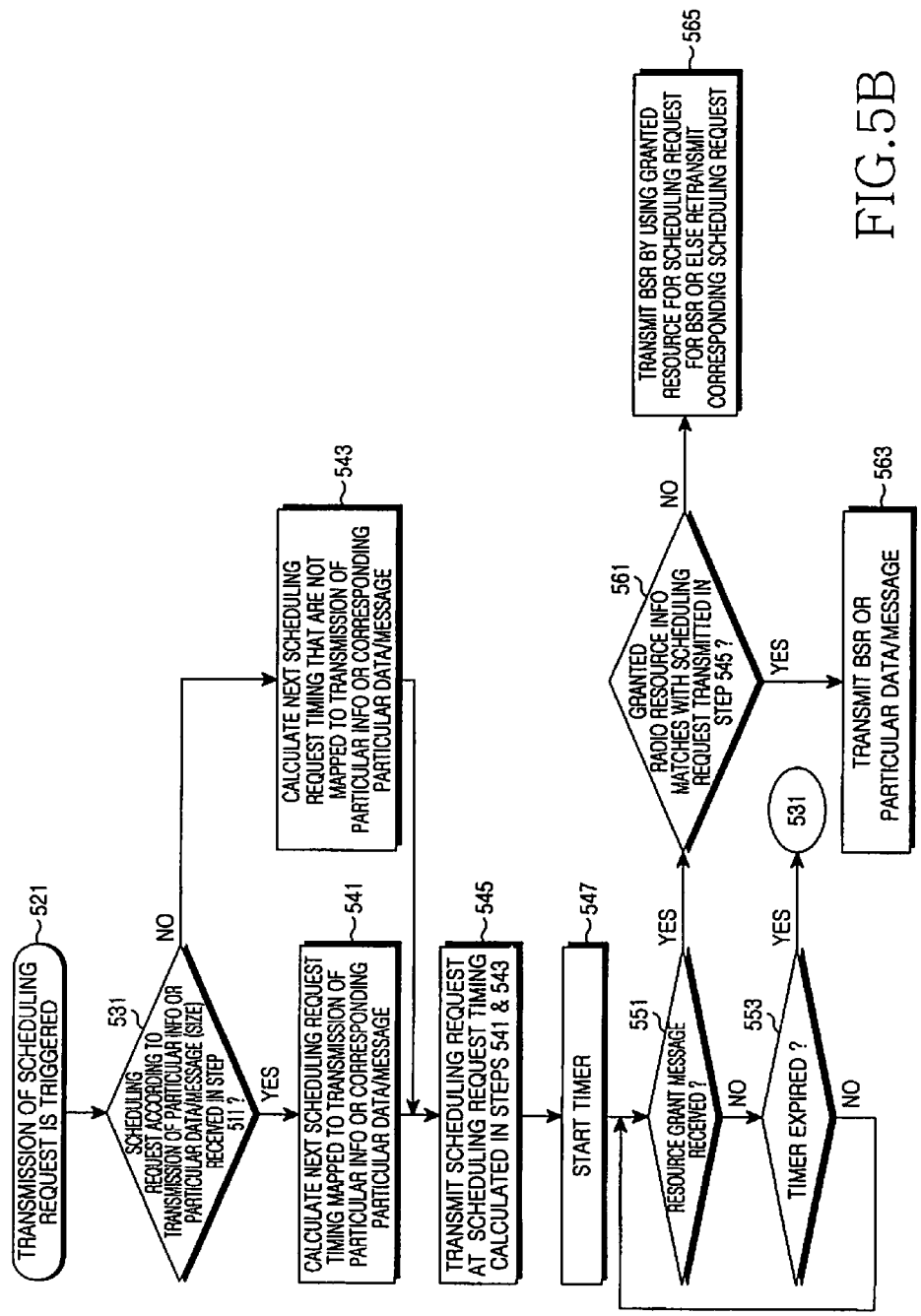

FIGS. 5A and 5B are flow diagrams illustrating an operation of a UE according to an embodiment of the present invention. Specifically, FIG. 5A illustrates an operation of a UE when the UE receives resource grant information for a scheduling request, and FIG. 5B illustrates an operation of a UE when transmission of the scheduling request is triggered.

Referring to FIG. 5A, in step 501, the UE receives resource grant information for transmission of a scheduling request from the ENB. Then, if the resource grant information includes any mapping information between a particular scheduling request timing and transmission of particular information or particular data/message (size), the UE manages the mapping information in step 511.

The mapping information may be included in resource grant information for transmission of a scheduling request when the resource grant information is received, transmitted through an independent message, or included in a Radio Bearer (RB) configuration information. The present invention has no limitation in the type of higher layer message through which the mapping information is transmitted, and the embodiment shown in FIGS. 4 and 5 is based on an assumption that the mapping information is included in resource grant information for transmission of a scheduling request.

Referring to FIG. 5B, when transmission of a scheduling request is triggered in step 521, the UE determines, in step 531, if the triggered scheduling request is a scheduling request triggered by transmission of particular information or particular data/message (size) received in step 511. When the triggered scheduling request is a scheduling request triggered by transmission of particular information or particular data/message (size) received in step 511, the UE proceeds to step 541, in which the UE calculates a next scheduling request timing mapped to transmission of particular information or corresponding particular data/message (size).

As described already above with reference to FIG. 3, if a value of N=20 has been received as a particular scheduling request timing to be mapped in step 511, resources for transmission of a scheduling request have been allocated at each 10 ms (for example, RFN #10, RFN #20, RFN #30, RFN #40, and RFN #50), and RFN in step 521 is #35, a scheduling request timing mapped to the next transmission of particular information or particular data/message (size) satisfying an equation defined by RFN (40) mod N (20)=0 is RFN #40.

In contrast, when the triggered scheduling request is a scheduling request triggered regardless of the transmission of particular information or particular data/message (size) received in step 511, the UE proceeds to step 543 in which the UE calculates the next scheduling request timing having no relation with the transmission of particular information or particular data/message (size). In the example described above, scheduling request timings after RFN #35 include RFN #40 and RFN #50. However, since RFN #40 corresponds to a timing mapped to transmission of particular information or particular data/message (size), RFN #50 is obtained as the next scheduling request timing having no relation to the transmission of particular information or particular data/message (size).

In step 545, a scheduling request is transmitted at the scheduling request timing calculated in step 541 or 543. Then, in step 547, a timer is started. The timer corresponds to a time waiting for reception of a resource grant message when the scheduling request requires allocation of a corresponding radio resource. In step 553, the UE determines if the timer has expired. When the UE receives a resource grant message before the timer expires, the UE determines, in step 561, if information of the granted radio resource matches with the scheduling request transmitted in step 545. When they match, that is, when the UE is allocated a radio resource corresponding to transmission of a BSR after transmitting a scheduling request at the timing calculated in step 543 or when the UE is allocated a radio resource corresponding to particular data/message (size) after transmitting a scheduling request at the timing calculated in step 541, the UE proceeds to step 563, in which the UE transmits the particular data/message or BSR.

In step 561, the UE determines if the granted radio resource matches with the scheduling request transmitted in step 545. When the granted radio resource does not match with the scheduling request transmitted in step 545, the UE proceeds to step 565. In step 565, the UE transmits a BSR by using the granted resource, if possible, when there is a scheduling request through steps 543 and 545, and calculates the scheduling timing again and retransmits the scheduling request at the calculated timing when there is a scheduling request through steps 541 and 545.

Figure 6:
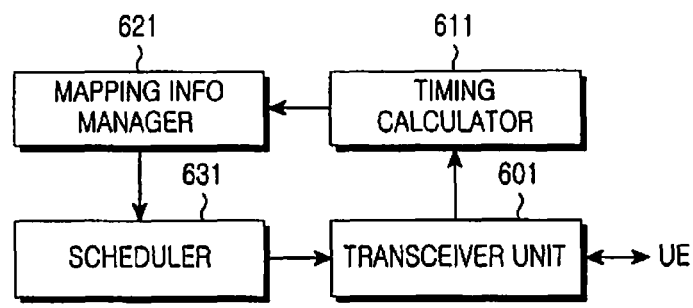
FIG. 6 is a block diagram of an ENB apparatus according to an embodiment of the present invention.

FIG. 6 is a block diagram of an ENB apparatus according to an embodiment of the present invention.

Referring to FIG. 6, a transceiver unit 601 transmits a higher layer message allocating a radio resource for transmission of a scheduling request to a UE, and receives a scheduling request signaling from the UE through the allocated radio resource.

A mapping information manager 621 manages a mapping relation context between a particular scheduling request timing and transmission of particular information or particular data/message (size). If mapping information between a particular scheduling request timing and transmission of particular information or particular data/message (size) has been transmitted to a particular UE through a higher layer message, the transmitted mapping information is maintained and managed by the mapping information manager 621.

Upon receiving a scheduling request message through the transceiver unit 601, a timing calculator 611 calculates the timing at which the UE has transmitted the scheduling request message, and determines if the scheduling request transmitted at the calculated timing through a timing mapping relation context and a scheduling request of the mapping information manager 621 requests a radio resource for transmission of a BSR or a radio resource for transmission of particular data/message (size), or serves as particular information.

According to the determination of the mapping information manager 621, a scheduler 631 allocates a radio resource for transmission of a BSR to the UE or a radio resource for transmission of particular data/message (size).

Figure 7:
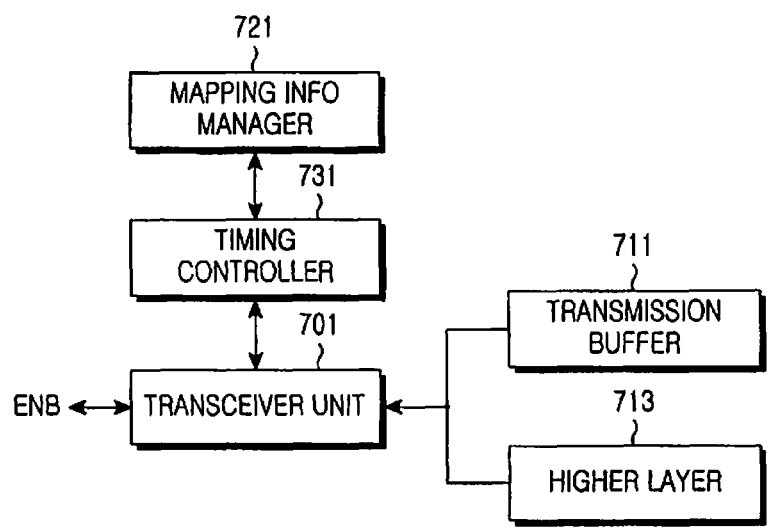
FIG. 7 is a block diagram of an ENB apparatus according to an embodiment of the present invention.

FIG. 7 is a block diagram of an ENB apparatus according to an embodiment of the present invention.

Referring to FIG. 7, a transceiver unit 701 receives radio resource information for transmission of a scheduling request from the ENB through a higher layer message, and transmits a scheduling request to the ENB by using the received information when it is necessary to signal the scheduling request.

A mapping information manager 721 maintains and manages mapping information between the scheduling request timing received through the transceiver unit 701 and transmission of particular information or particular data/message (size). If a transmission packet with a new size occurs in the transmission buffer 711 or an indicator instructing transmission of particular information managed by the mapping information manager 721 is given from a higher layer 713, a timing controller 731 determines a timing for transmission of a scheduling request, and transmits the scheduling request at the determined timing through the transceiver unit 701. When the transmission packet having occurred in the transmission buffer 711 corresponds to particular data/message (size) maintained and managed by the mapping information manager 721 or when the particular information, transmission of which is instructed by the indicator given from the higher layer 713, is information managed by the mapping information manager 721, the scheduling request is transmitted at the mapped particular timing.

According to the present invention, for data/message pre-promised between a UE and a network node, the UE transmits a scheduling request at a predetermined timing. When the network node has received the scheduling request at the predetermined timing, the network node directly allocates a resource for transmission of the promised data/message by itself, so that the UE can instantly transmit the data/message. As a result, the present invention can reduce the transmission delay.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for scheduling a User Equipment (UE) by an Evolved Node B in a mobile communication system, the method comprising the steps of:
   determining a scheduling request timing, by the Evolved Node B, for transmitting a scheduling request for a transmission of particular data;
   transmitting information related to the scheduling request timing to the UE;
   receiving a scheduling request from the UE;
   determining if a reception time of the scheduling request received from the UE corresponds to the determined scheduling request timing;
   transmitting a message for allocating a radio resource for the transmission of the particular data to the UE if it is determined that the reception time of the scheduling request received from the UE corresponds to the scheduling request timing; and
   receiving the particular data from the UE through the allocated radio resource.

2. The method of claim 1, wherein the particular data comprises at least one of frequently transmitted data, message sensitive to a delay, and particular information for a particular operation.

3. The method of claim 1, wherein, when the scheduling request timing is used for notification of transition from a talk spurt state to a silent state in a VoIP service, the information related to the scheduling request timing comprises codec information used in the VoIP service and state transition information in the VoIP service.

4. The method of claim 1, wherein the information related to the scheduling request timing includes scheduling request timings for each transmission of at least two particular data.

5. A method for transmitting a scheduling request to an Evolved Node B by a User Equipment (UE) in a mobile communication system, the method comprising the steps of:
   receiving information related to a scheduling request timing for a transmission of particular data, determined by the Evolved Node B, from the Evolved Node B;
   determining if data to be transmitted to the Evolved Node B corresponds to the particular data;
   transmitting a scheduling request for the transmission of the particular data at the determined scheduling request timing to the Evolved Node B if it is determined that the data corresponds to the particular data;
   receiving a message for allocating a radio resource for the transmission of the particular data from the Evolved Node B; and
   transmitting the particular data through the radio resource to the Evolved Node B.

6. The method of claim 5, wherein the particular data comprises at least one of frequently transmitted data, message sensitive to a delay, and particular information for a particular operation.

7. The method of claim 5, wherein, when the scheduling request timing is used for notification of transition from a talk spurt state to a silent state in a VoIP service, the information related to the scheduling request timing comprises codec information used in the VoIP service and state transition information in the VoIP service.

8. The method of claim 5, wherein the information related to the scheduling request timing includes scheduling request timings for each transmission of at least two particular data.

9. An apparatus of an Evolved Node B for scheduling a User Equipment (UE) in a mobile communication system, the apparatus comprising:
   a scheduler configured to determine a scheduling request timing, by the Evolved Node B, for transmitting a scheduling request for a transmission of particular data; and
   a transceiver configured to transmit information related to the scheduling request timing for the transmission of the particular data to the UE and receiving a scheduling request from the UE,
   wherein the scheduler is further configured to determine if a reception time of the scheduling request received from the UE corresponds to the determined scheduling request timing, and
   wherein the transceiver is further configured to transmit a message for allocating a radio resource for the transmission of the particular data to the UE if it is determined that the reception time of the scheduling request received from the UE corresponds to the scheduling request timing, and receive the particular data from the UE through the allocated radio resource.

10. The apparatus of claim 9, wherein the particular data comprises at least one of frequently transmitted data, message sensitive to a delay, and particular information for a particular operation.

11. The apparatus of claim 9, wherein, when the scheduling request timing is used for notification of transition from a talk spurt state to a silent state in a VoIP service, the information related to the scheduling request timing comprises codec information used in the VoIP service and state transition information in the VoIP service.

12. The apparatus of claim 9, wherein the information related to the scheduling request timing includes scheduling request timings for each transmission of at least two particular data.

13. An apparatus of a User Equipment (UE) for transmitting a scheduling request to an Evolved Node B in a mobile communication system, the apparatus comprising:
   a transceiver configured to receive information related to a scheduling request timing for a transmission of particular data, determined by the Evolved Node B, from the Evolved Node B; and
   a controller configured to determine if data to be transmitted to the Evolved Node B corresponds to the particular data,
   wherein the transceiver is further configured to transmit a scheduling request for the transmission of the particular data at the determined scheduling request timing to the Evolved Node B if it is determined that the data corresponds to the particular data, receive a message for allocating a radio resource for the transmission of the particular from the Evolved Node B, and transmit the particular data through the radio resource to the Evolved Node B.

14. The apparatus of claim 13, wherein the particular data comprises at least one of frequently transmitted data, message sensitive to a delay, and particular information for a particular operation.

15. The apparatus of claim 13, wherein, when the scheduling request timing is used for notification of transition from a talk spurt state to a silent state in a VoIP service, the information related to the scheduling request timing comprises codec information used in the VoIP service and state transition information in the VoIP service.

16. The apparatus of claim 13, wherein the information related to the scheduling request timing includes scheduling request timings for each transmission of at least two particular data.

\* \* \* \* \*